July 19, 1966 T. C. SHARPE 3,261,564

TAPE HANDLING APPARATUS

Filed July 15, 1963 2 Sheets-Sheet 1

United States Patent Office 3,261,564
Patented July 19, 1966

3,261,564

TAPE HANDLING APPARATUS

Terence Clifford Sharpe, London, England, assignor to Decca Limited, London, England, a British company Filed July 15, 1963, Ser. No. 295,049
Claims priority, application Great Britain, Feb. 27, 1963, 7,926/63
5 Claims. (Cl. 242—55.12)

This invention relates to tape handling apparatus.

In high speed magnetic tape recording and reproducing apparatus, it is necessary to traverse the tape past the recording and reproducing heads at a controlled speed. The tape has to be accelerated and decelerated quickly so that any selected portion of the tape may be read as required. In a typical modern high speed tape recorder and reproducer for use with digital data processing apparatus, the time required to accelerate the tape to a speed of 150 inches per second may be less than 2 milliseconds. It is impossible to accelerate the tape spools carrying a long length of tape in this short time and thus the length of tape passing the recording and reproducing heads must be started and stopped independently of the tape spools. There have therefore to be tape reservoirs between the take-up and feed spools and the driving capstans for moving the tape past the recording and reproducing heads. The present invention is more particularly concerned with tape handling apparatus having a reservoir of the kind known as a scramble bin. Such a reservoir comprises essentially two parallel plates spaced apart a distance slightly greater than the width of the tape and the tape is fed into this bin so that it lies there in a series of loose loops. With such a tape reservoir it is necessary to provide means for sensing the amount of tape in the reservoir and to employ a servo-mechanism to drive the associated tape spool to feed tape into or to take up tape from the tape reservoir so that the reservoir always contains sufficient but not too much loose tape to permit of proper acceleration of the tape past the recording and reproducing heads when required. The servo-mechanism in a typical example might be arranged to keep of the order of 30 feet of tape in a scramble bin type reservoir.

For sensing the amount of tape in such a reservoir it has previously been proposed to use optical sensing means with light from a light source directed through the tape reservoir in parallel rays which are not normal to the planes of the bin walls so that the light rays are intercepted by the tape which lies in loops with the plane of the tape always normal to the bin walls. Such an arrangement necessitates the use of a light source extending over substantially the whole area of the bin and collimating means for ensuring that the light rays are parallel and in the appropriate direction. Such an arrangement has the property that, over a limited range of variation of the amount of tape in the bin, the change in light intensity, which may be measured by photo-cells on the side of the bin opposite to the light source, is approximately linearly proportional to the change in the length of tape. Such a system however has the disadvantage that a very high proportion of the light is cut off by the collimating means. Furthermore since it is necessary to illuminate the whole or substantially the whole surface area of the bin it is necessary to have a multiple light source. This raises serious problems in the monitoring of the light source since variations in the intensity of the light from the source will effect the output signal. It is difficult with photo-cells to monitor the total light emission from a number of lamps and hence in such arrangements there are difficulties in ensuring that the system operates always to maintain the required length of tape in the bin; there is a tendency for the amount of tape to drift and this may interfere with the working of the whole tape handling apparatus since the acceleration requirements necessitate a certain minimum amount of tape being present in the bin whilst, if too much tape is put into the bin, the amount of light reaching the sensing photo-cells becomes so small that the sensing system may become insensitive.

According to the present invention, in tape handling apparatus there is provided a scramble bin formed of two parallel sheets of transparent material between which the tape is scrambled, the sheets of transparent material being spaced apart a distance slightly greater than the width of the tape, a light source and a diffusing screen on one side of the scramble bin and a sensing photo-cell system on the other side of the bin, the light source and diffusing screen being arranged so that light passes through the bin in many directions and there is provided a monitor photo-cell system adjacent the light source, circuit means for adjusting the output of said sensing photo-cell system and the output of the monitor photo-cell system to equality when the bin contains a predetermined quantity of tape, and a pair of trigger circuits responsive to the difference between the outputs of the two photo-cell systems, one trigger circuit being arranged to operate when the output from the sensing photo-cell system falls a predetermined amount below the output from the monitor photo-cell system and the other trigger circuit being arranged to operate when the output from the sensing photo-cell system rises by a different smaller predetermined amount above the output of the monitor photo-cell system. This arrangement provides output signals which are particularly suitable for an on/off servo-mechanism controlling the operation of the associated tape spool which is driven in the appropriate direction to feed tape into or take up tape from the bin according to which of the trigger circuits gives an output. Since the light is not constrained to travel in parallel beams, adequate light intensity may readily be obtained without a large multiplicity of lamps and very conveniently a single strip lamp is employed with a diffusing screen between the lamp and the bin wall so that the wall of the bin is substantially uniformly illuminated. A single lamp may readily be accurately monitored by a photo-cell system and, with a single strip lamp, conveniently two rows of photo-cells are provided one on each side of the lamp and spaced away therefrom in directions parallel to the plane of the bin wall so that the total light emitted by the lamp is monitored. Since, with the scattered light from the light source employed in this arrangement, the amount of light cut off for a given amount of tape introduced into the bin decreases as the amount of tape in the bin increases, the output from the sensing photo-cell system is not linearly representative of the amount of tape in the bin but compensation is given for this non-linearity by making the two trigger circuits operate on different predetermined changes from the datum output level of the photo-cell system. This arrangement thus permits of the servo-system being given control signals when the amount of tape changes by a known predetermined amount in either direction from the datum level and, because of the possibility of accurate monitoring of the light source, it is readily possible to avoid drift in the datum level due to changes in the light intensity. Such changes are of particular importance where a fluorescent lamp is employed since the light emission from the lamp is affected not only by voltage changes but also by the ambient temperature and temperature of the lamp.

The following is a description of one embodiment of the invention, reference being made to the accompanying drawings in which.

Figures 1, 2, 3:
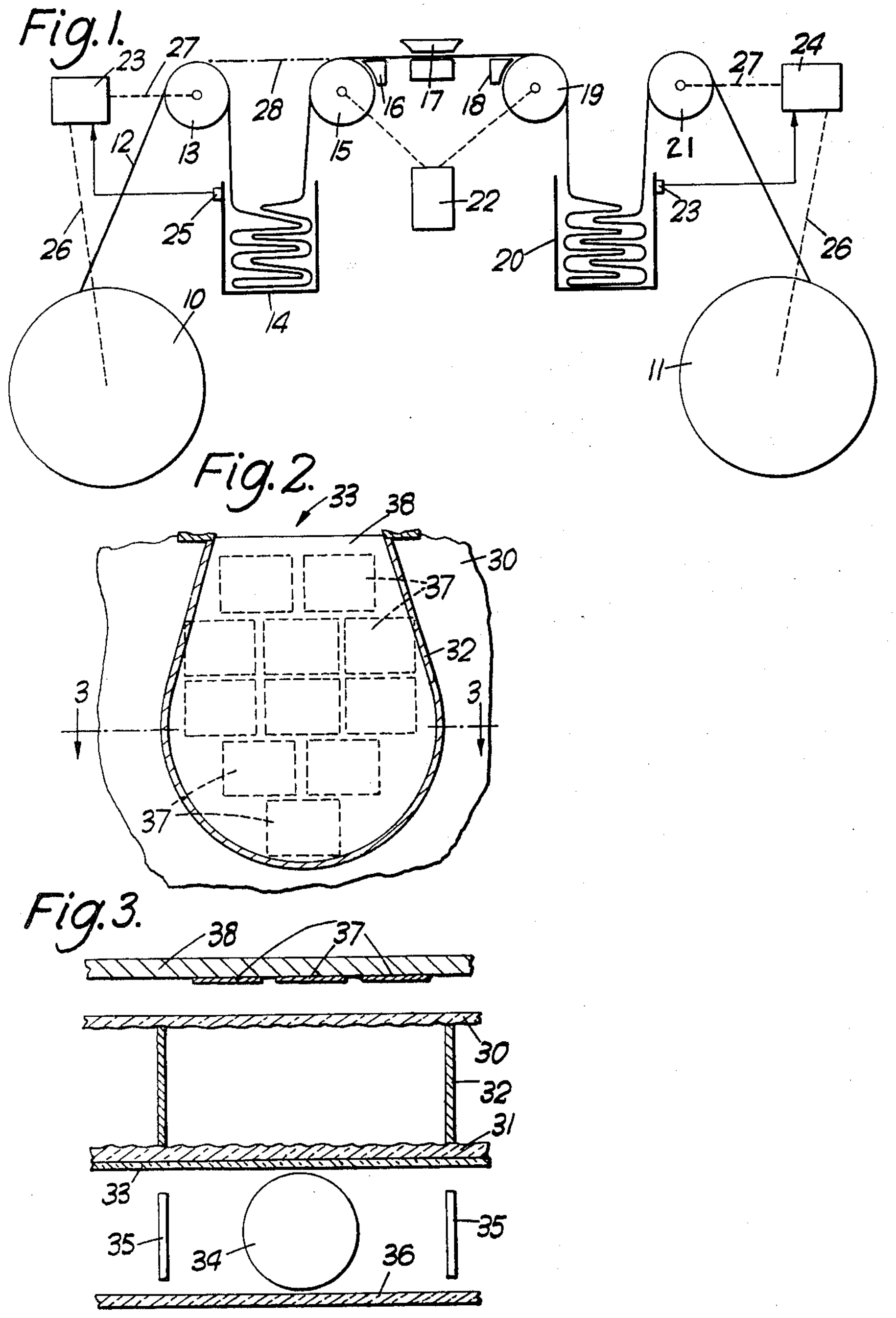
FIGURE 1 is an explanatory diagram for explaining the general arrangement and operation of a high speed magnetic tape unit using tape reservoirs.
FIGURE 2 is a vertical section through a scramble bin tape reservoir of the present invention.
FIGURE 3 is a horizontal section along the line 3—3 of FIGURE 2.

FIGURE 1 illustrates diagrammatically a high speed tape unit such as might be used with digital data processing apparatus. The unit of FIGURE 1 is symmetrical so that the tape can be moved in either direction past a head unit for writing on the tape or reading the tape. Two tape spools 10, 11 are provided, the tape 12 drawn from one spool and wound on the other. In passing from the spool 10 to the spool 11, the tape 12 is taken over a first capstan 13 which will be referred to as the lefthand tape spool capstan and thence into a tape reservoir illustrated diagrammatically at 14. From the reservoir 14 the tape extends over a tape drive capstan 15 and thence over a back tensioning block 16 and past recording and reproducing heads 17. The right-hand half of the unit of FIGURE 1 is similar to the left-hand half, the tape extending from the heads 17 over a back tensioning block 18 and a tape drive capstan 19 into a reservoir illustrated diagrammatically at 20. From the tape reservoir 20 the tape extends over a further capstan 21 referred to as the right-hand tape spool capstan and thence on the spool 11. In this particular unit the two tape drive capstans 15, 19 are conveniently of the type described and claimed in co-pending U.S. patent application Serial No. 177,477, now Patent No. 3,151,795, and reference may be made to the specification of the application for fuller description of these capstans. For the present, it will suffice to say that these are vacuum capstans which are continuously rotated in opposite directions by means of an electric motor 22. The tape is driven in one or other direction by applying vacuum from a vacuum source to the appropriate capstan so that the tape is held in contact with that capstan and is driven thereby but passes freely over the other capstan. The directions of rotation of these two capstans are such that each tends to draw the tape away from the heads 17. The back tensioning unit 16, 18 are guide blocks of the kind described and claimed in co-pending U.S. patent application Serial No. 244,071, now abandoned, in which vacuum suction is applied to the tape through apertures in a guide block so as to draw the tape down onto the block and so apply a tension to the tape no matter in which direction the tape is moving. The tape has to be drawn past the heads 17 in accordance with the requirements of the data processing systems with which the unit is associated and the data processing apparatus therefore controls the application of the vacuum to these two capstans. In normal operation, the tape passing the heads has frequently to be stopped and started in accordance with the requirements of the data processing system. In order to ensure rapid acceleration and deceleration of the portion of the tape passing the heads, the amount of the tape to be accelerated and decelerated must be kept to a minimum and the requisite tape is drawn from one of the reservoirs 14 or 20 according to the required direction of movement and the tape is fed from the tape driving capstan 19 or 15 into the other reservoir. These reservoirs 14 and 20 provide temporary storage for the portion of tape about to be drawn or which has been drawn past the heads and, by using these reservoirs 14 and 20, the tape spools 10, 11 need not be rapidly accelerated and decelerated in accordance with the requirements of the data processing apparatus but have only to be controlled to ensure that there is always some, but not too much, tape in each of the two reservoirs. The tape spools 10, 11 are controlled respectively by servo systems 23, 24 including electric motors for driving the spools as indicated by the dashed lines 26. The servo systems are controlled by photo-electric sensing means indicated diagrammatically at 25 so that the spool drive motors are driven in accordance with the amount of tape in the respective tape reservoirs 14, 20. These servo system motors also drive the capstans 13, 21 as indicated diagrammatically by the lines 27. These capstans 13, 21, are vacuum capstans which serve to drive the tape into a reservoir and also to keep the portion of the tape between the spool and spool capstan under tension. A fuller description of a preferred form of vacuum capstan for this purpose is given in the specification of co-pending U.S. patent application Serial No. 247,231, now Patent No. 3,195,791. As tape is wound on or drawn off one of the spools 10, 11, the effective diameter of the spool will therefore increase or decrease. The linear speed of the tape passing onto or off a spool depends not only on the speed of rotation of the spool but also on the amount of the tape on the spool. Considering tape being drawn off the spool 10, the servo system 23 controls the spool drive to ensure that the requisite amount of tape is fed into the reservoir. The tape spool capstan 13, with vacuum suction applied, is rotated continuously at a speed such that the surface of the capstan exceeds that of the moving tape. The tape slips on the capstan which thus applies a tension to the tape. The drive to the spool 10 thus controls the rate of movement of the tape whilst the tape spool capstan serves to apply tension to the part of the tape being drawn off the spool. The speeds of the spools 10 and the spool capstan 13 need not therefore be related provided that whatever the diameter of the tape on the spool 10, the surface speed of the spool capstan 13 is sufficient to put the necessary tension on the tape being drawn off the spool. When tape is being fed out of the reservoir, for example out of the reservoir 14 on the spool 10, the associated tape spool capstan 13 is kept stationary. As previously mentioned, this spool capstan however, is a vacuum capstan and the vacuum is kept applied so that a back tension is put on the tape which is drawn over the capstan by the rotation of the spool 10. The tape speed, as before, is controlled by the servo system and spool drive. It will be seen therefore that the two tape spool capstans 13, 21 not only drive the tape into the associated reservoir but also fulfil the function of keeping a constant tension on the portion of the tape between each capstan and the associated spool.

The present invention is more particularly concerned with the tape reservoirs 14 and 20 and the associated equipment for sensing the amount of tape in these reservoirs and controlling the drives for feeding tape into or taking it out from the reservoirs. The two tape reservoirs 14, 20 are identical in principles of construction and operation. One such tape reservoir is illustrated in FIGURES 2 and 3 and is formed of two parallel sheets of rough cast glass 30, 31 which are spaced apart in parallel planes a distance greater than the width of the tape. Between the two parallel sheets of glass 30, 31 is a curved strip of rigid material 32 which is bent to form a U-shaped wall to the scramble bin with the mouth of the U slightly narrower than the base of the U, the base portion being generously rounded. The U is upright with the mouth at the top and the tape is fed in and taken out through this single aperture. The walls 30, 31 are formed of rough cast glass since this has a smooth but undulating surface and hence there is much less possibility of the tape sticking to the side walls due to electrostatic charges than if the walls were made of flat glass or like material.

On one side of the bin is a diffusing screen 33 formed of translucent material, for example a translucent polymethyl methacrylate resin and behind this translucent material is a single strip lamp 34 which preferably is arranged vertically upright and along the centre line of the bin. The strip lamp 34 is a fluorescent tube type lamp and extends for substantially the whole height of the bin.

The light output from this lamp is monitored by two rows of photo-cells 35, one on each side of the lamp and spaced away therefrom a distance conveniently equal to or slightly greater than the maximum horizontal dimension of the bin. The monitor photo-cells 35 are selenium barrier type photo-cells in the form of plates which are positioned adjacent to one another in a line extending for the full length of the strip lamp so that the total light output from the lamp is monitored. Behind the strip lamp 34 is a mirror 36 for reflecting light towards the diffusing screen 33 and so into the scramble bin. It will be seen that the light source 34 and mirror 36 cause light to pass through the bin in many directions.

Figure 4:
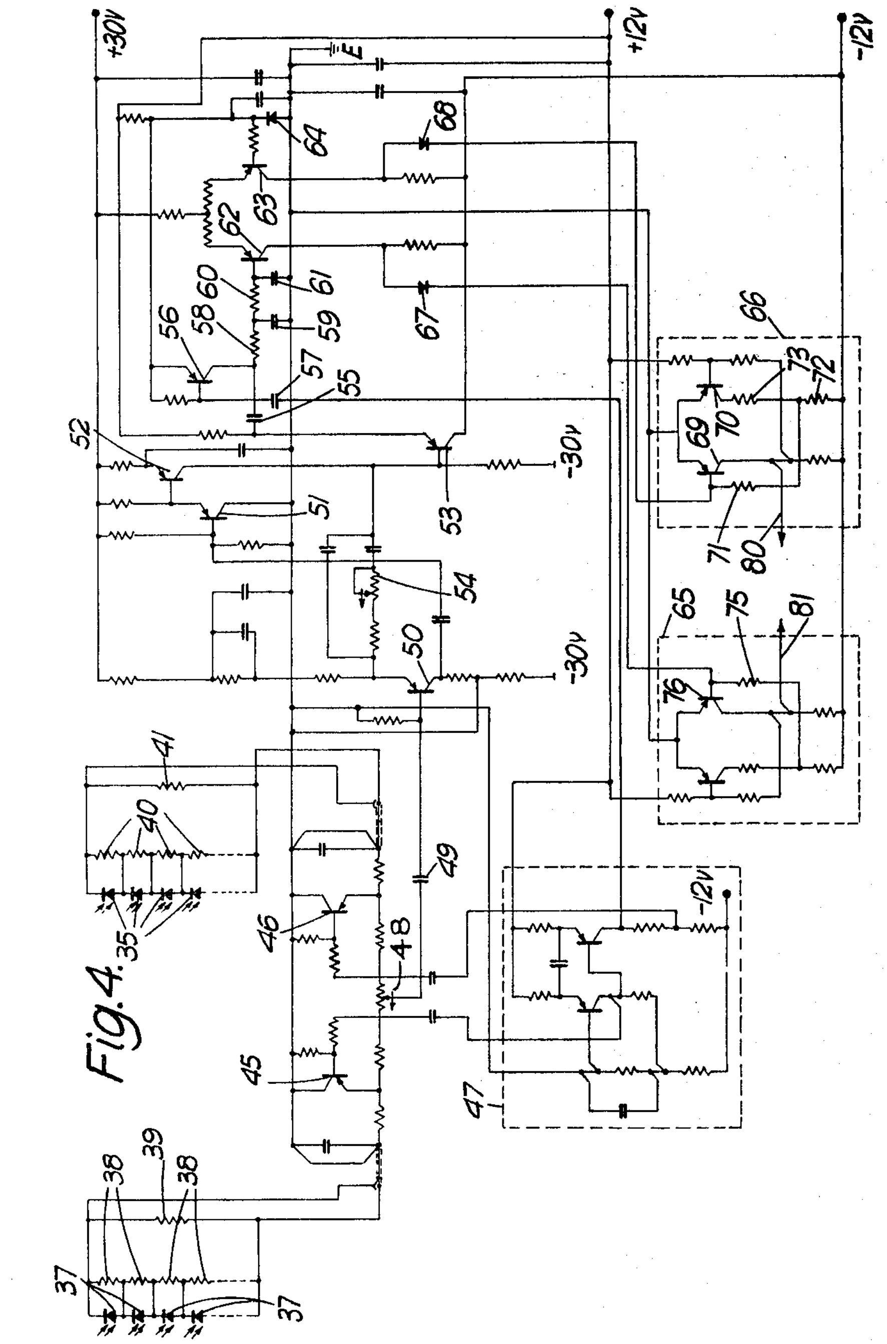
FIGURE 4 is a circuit diagram illustrating how the electrical signals from photo-cells in the tape reservoir of FIGURES 2 and 3 are employed for controlling the tape drive.

On the other side of the bin are arranged a series of photo-cell plates 37, also selenium barrier photo-cells, in the form of plates which cover substantially the whole surface area of the bin. The various sensing photo-cells 37 which, as shown in FIGURE 4, are all connected in series each with a separate shunt resistor 38 and in shunt across the whole series of photo-cells is an adjustable resistor 39 enabling the total output signal for a given light intensity to be adjusted. Similarly all the monitor photo-cells 35 are connected in series, each with a separate shunt resistor 40, and an adjustable resistor 41 is connected in shunt across the whole monitor cell series for adjusting the output for a given total light intensity. The magnitude of the resistor 41 is adjusted so that the monitor output is approximately the same as the output from the sensing photo-cells 37 when the bin contains a predetermined amount of tape, e.g. 30 feet, which is to be the mean value maintained in the reservoir. The sensing and monitor photo-cells are operated on linear parts of their characteristics that is to say the output signal is linearly proportional to the light intensity. The outputs from the sensing photo-cells 37 and the monitor photo-cells 35 are fed to a differential amplifier which as illustrated in FIGURE 4 is a chopper amplifier comprising two transistors 45, 46 across the emitter-collector circuits of which are applied respectively the signals from the sensing and monitor photo-cells and to the bases of which are fed antiphase outputs from a multivibrator 47. The output from the differential amplifier is taken from a tap on an adjustable potentiometer 48 connected between the emitters of transistors 45, 46, which potentiometer provides an adjustment for setting the amount of tape to give zero output. The signal from the potentiometer 48 is coupled by an alternating current coupling circuit including a series capacitor 49 to the base of a transistor 50 which forms an amplifying stage amplifying the alternating current component from the chopper. The output from transistor 50 is further amplified by transistors 51, 52 and applied to an emitter follower 53. The gain of the amplifier is controlled by an adjustable resistor 54 in a feedback circuit from the collector of transistor 52 to the emitter of transistor 50. The output from the emitter follower 53 is fed through a capacitor 55 to a phase sensitive detector circuit including a transistor 56 which is driven from the multivibrator 47 with a rectangular waveform to charge a capacitor 57 in one half cycle and to discharge it in the next half cycle. At the output of the capacitor 55, the signal from the differential amplifier is thus phase detected to give positive going pulses for alternate half cycles if there is too little tape in the reservoir or negative going pulses if there is too much tape. This output is fed into an integrating circuit comprising resistor 58 capacitor 59, resistor 60 and capacitor 61. The D.C. output from the integrating circuit is applied to the base of a transistor 62 which with a transistor 63 forms a differential amplifier. The base of transistor 63 is maintained at a constant voltage by a Zener diode 64. The differential amplifier provides an output from the collector of either transistor 62 or transistor 63 according to the polarity of the input and these are fed separately to two Schmitt trigger circuits 65 and 66 via diodes 67 and 68. These two trigger circuits are similar in manner of operation but the component values are different so that they operate at different triggering levels. Considering the trigger circuit 66, this has two transistors 69, 70; transistor 69 is normally conductive due to current through resistors 71 and 72 in the base circuit. When the current in transistor 63 increases sufficiently, the transistor 69 will start to switch off. This will switch on the transistor 70 and thus current will be drawn through resistors 73 and 72 in the emitter circuit of transistor 70. This will lower the current through resistor 71 and so complete the switching operation. For switching back to the original state, the current through the diode 68 must fall substantially below the value required for switching on. This backlash is desirable as it reduces the effect of "noise" signals in the photo-cell outputs.

The sensitivity of the two trigger circuits are made different by using a lower resistance for resistor 71 in the base circuit of transistor 69 than for the corresponding resistor 75 in the base circuit of transistor 76 in the trigger circuit 65. The reason for this is that, considering as a datum, the amount of tape in the bin necessary to give zero output from the chopper amplifier, very much less tape has to be removed from the bin than need be added to it to give the same change in the output from the sensing photo-cells 37. This is because the more tape that is put into the bin, the less effect it has on the amount of light transmitted. This will be apparent by considering the first few feet of tape put in the bin; since the tape will lie always with its plane normal to the plane of the transparent walls of the bin and since the light is directed through the bin in many directions, an appreciable portion will be cut-off by the first few feet of tape and only light passing in directions normal to the walls of the bin or at small angles thereto will pass between the tape. Further tape in the bin will squash down the loops previously in the bin and hence will further limit the angular deviation from the normal of light that can be transmitted but the reduction in light transmitted for each unit length of tape put in the bin falls off. The trigger circuit 66 providing the signal on an output lead 80 indicating too little tape in the bin is therefore made much less sensitive than the trigger circuit 65 providing the signal on an output lead 81 indicating too much tape in the bin.

The signals on the leads 80 and 81 are used to operate the associated servo systems 23 or 24 of FIGURE 1, it being remembered that each bin has an associated servo system controlling the feeding of tape into or the drawing of tape out of the bin. These servo systems are of the on-off type and it will be seen that, provided the backlash before one trigger circuit is switched off is less than the change necessary to switch the other trigger circuit on, signals demanding tape feed can never be obtained simultaneously on leads 80 and 81. In other words the backlash must be less than the dead zone between the levels of tape demanding feed into and feed out of the bin so that if there is no demand for tape, the tape will come to rest with an amount of tape in the bin such that neither trigger circuit would be operative. The width of this dead zone can be controlled by the aforementioned variable resistor 54 which controls the gain of the amplifier and thus it can be ensured that the dead zone is sufficient.

With the above described construction in which the light is directed through the bin in many directions, a given amount of tape will cut off a much greater proportion of the light than in prior types of optically sensed bins in which the light is directed through the bin in a selected direction, the sensitivity to changes of light intensity are very much less; in one particular embodiment of the invention, it has been found that a change of 3 to 1 in the light intensity was equivalent to a change of less than 1 foot of tape in a bin holding 30 feet as a normal datum level. Due to this and the use of monitor photo-cells as described above, the variations in light emission due to voltage changes or due to changes in the ambient temperature or the temperature of the lamp can be kept very small.

I claim:

1. Tape handling apparatus comprising a scramble bin formed of two parallel sheets of transparent material between which the tape is scrambled, and a connecting wall, the sheets of transparent material being spaced apart a distance slightly greater than the width of the tape by said wall, a light source and a diffusing screen on one side of the scramble bin and a sensing photo-cell system on the other side of the bin, the light source and diffusing screen being arranged so that light passes through the bin in many directions, a monitor photo-cell system adjacent the light source, circuit means for adjusting the output of said sensing photo-cell system and the output of the monitor photo-cell system to equality when the bin contains a predetermined quantity of tape, and a pair of trigger circuits responsive to the difference between the outputs of the two photo-cell systems, one trigger circuit being arranged to operate when the output from the sensing photo-cell system falls a predetermined amount below the output from the monitor photo-cell sytem and the other trigger circuit being arranged to operate when the output from the sensing photo-cell system rises by a different smaller predetermined amount above the output of the monitor photo-cell system.

2. Tape handling apparatus as claimed in claim 1 further comprising an on/off servo mechanism controlling the operation of an associated tape spool which is driven in the appropriate direction to feed tape into or take-up tape from the bin according to which of the trigger circuits gives an output.

3. In tape handling apparatus comprising a scramble bin formed of two parallel sheets of transparent material between which the tape is scrambled, and a connecting wall, the sheets of transparent material being spaced apart a distance slightly greater than the width of the tape by said wall, a single strip lamp constituting a light source and a diffusing screen on one side of the scramble bin and a sensing photo-cell system on the other side of the bin, the lamp and diffusing screen being arranged so that light passes through the bin in many directions, a monitor photo-cell system adjacent the lamp, circuit means for adjusting the output of said sensing photo-cell system and the output of the monitor photo-cell system to equality when the bin contains a predetermined quantity of tape, and a pair of trigger circuits responsive to the difference between the outputs of the two photo-cell systems, one trigger circuit being arranged to operate when the output from the sensing photo-cell system falls a predetermined amount below the output from the monitor photo-cell system and the other trigger circuit being arranged to operate when the output from the sensing photo-cell system rises by a different smaller predetermined amount above the output of the monitor photo-cell system.

4. Tape handling apparatus as claimed in claim 3 wherein said monitor photo-cell system comprises two rows of photo-cells, one on each side of the lamp and spaced away therefrom in directions parallel to the plane of the transparent sheets.

5. Tape handling apparatus as claimed in claim 3 wherein said sensing photo-cell system comprises an array of photo-sensitive elements covering substantially the whole area of the bin on said other side thereof.

References Cited by the Examiner

UNITED STATES PATENTS

| | | | |
|---|---|---|---|
| 2,960,611 | 11/1960 | Namenyi-Katz ------ | 274—4 X |
| 3,078,056 | 2/1963 | Alterman --------- | 242—55.12 |

FRANK J. COHEN, *Primary Examiner.*

G. F. MAUTZ, *Assistant Examiner.*